United States Patent [19]

Schenk et al.

[11] Patent Number: 5,572,520
[45] Date of Patent: Nov. 5, 1996

[54] METHOD AND CIRCUIT ARRANGEMENT FOR CONTROLLING THE TRANSMISSION OF MESSAGE BLOCKS WITHIN A TRANSMISSION SYSTEM

[75] Inventors: Heinrich Schenk; Stephan Knecht, both of Munich, Germany

[73] Assignee: Siemens Aktiengesellschaft, Munich, Germany

[21] Appl. No.: 387,188

[22] Filed: Feb. 13, 1995

[30] Foreign Application Priority Data

Feb. 18, 1994 [DE] Germany .......................... 44 05 262.6

[51] Int. Cl.$^6$ .................................................. H04L 12/56
[52] U.S. Cl. .................................................. 370/60
[58] Field of Search .......................... 370/60.7, 60.1, 370/60, 94.1, 94.2, 79, 84, 118; 375/240, 200, 225, 287, 288; 348/384; 380/23; 455/72; 340/825.03

[56] References Cited

U.S. PATENT DOCUMENTS

| 5,119,367 | 6/1992 | Kawakatsu et al. | 370/54 |
| 5,243,594 | 9/1993 | Dasch et al. | 370/61 |
| 5,335,224 | 8/1994 | Cole et al. | 370/94.1 |
| 5,450,225 | 9/1995 | Bostica et al. | 370/60.1 |

FOREIGN PATENT DOCUMENTS

| 0475180A1 | 3/1992 | European Pat. Off. . |
| 0577359 | 5/1994 | European Pat. Off. . |
| 4121863A1 | 7/1993 | Germany . |

*Primary Examiner*—Douglas W. Olms
*Assistant Examiner*—Dang Ton
*Attorney, Agent, or Firm*—Hill, Steadman & Simpson

[57] ABSTRACT

In a method and circuit arrangement for controlling the transmission of message blocks within a transmission system, the transmission system has transmission processors connected to one another available to it, proceeding wherefrom the message blocks intended therefor are respectively forwarded to an input queue of an individually allocated line termination equipment with a defined transmission rate after passing through a processor queue. This line termination equipment has a plurality of interfaces available to it with which a transmission line designed for an outflow rate that is lower in comparison to the defined transmission rate is respectively connected for the forwarding of message blocks. A flow control is thereby provided between the respective transmission processor and the corresponding line termination equipment such that a momentary load value is individually calculated in the respective transmission processor for the individually allocated interfaces. The load value is calculated according to the criterion of the plurality of message blocks respectively forwarded thereto per time unit. Given upward transgression of a defined limit value by the momentary load value calculated for one of the interfaces, the output of message blocks to the respective interface is suppressed.

11 Claims, 2 Drawing Sheets

5,572,520

METHOD AND CIRCUIT ARRANGEMENT FOR CONTROLLING THE TRANSMISSION OF MESSAGE BLOCKS WITHIN A TRANSMISSION SYSTEM

BACKGROUND OF THE INVENTION

Field of The Invention

The invention is directed to a method and to a circuit arrangement for controlling the transmission of message blocks within a transmission system.

EP-A1-0 475 180, corresponding to U.S. Pat. No. 5,243,594 incorporated herein by reference, has already disclosed a telecommunication switching system for the transmission of message blocks wherein line termination equipment units connected to transmission lines are connected via an internal line system to a plurality of switching computers, and one of the switching computers as well as at least one of the line termination equipment units are involved in the transmission of message blocks during the course of a call. Among other things, it is thereby provided that message blocks previously inserted into a transmission queue proceeding from a switching computer are first continuously transmitted to a line termination equipment unit coming into consideration for the respective call, i.e. with an open window size $W=\infty$, and are inserted into a reception queue thereat. When a predetermined filling degree of such a reception queue has been reached, the transmission of message blocks to the respective line termination equipment unit is interrupted for a defined time span. The message blocks that are thereby initially not capable of transmission are thereby inserted into a recovery or reset queue individually established for the respective line termination equipment unit. After the expiration of the defined time span, the transmission of message blocks to the respective line termination equipment unit is then reassumed, initially taking the message blocks inserted into the previously established recovery or reset queue into consideration.

Alternatively or additionally thereto, line queues individually allocated to the transmission lines connected to a line termination equipment unit can be provided in a line termination equipment unit. The message blocks initially output by a switching computer with an open window size ($W=\infty$) are inserted into these line queues. When a defined, first filling degree of such a line queue is upwardly exceeded, a corresponding control signal is transmitted proceeding from the respective line termination equipment unit to the switching computer coming into consideration. In response thereto, the message blocks intended for the corresponding line queue are only transmitted to the respective line termination equipment unit with a window size of $W=1$. When a defined, second filling degree lying above the first filling degree is reached for a line queue, this again being indicated by a corresponding control signal proceeding from the respective line termination equipment unit, by contrast the transmission of message blocks to be inserted into the corresponding line queue is interrupted, proceeding from the respective switching computer. The message blocks that are initially incapable of transmission as a result thereof are thereby inserted into a recovery or reset queue allocated to the corresponding line queue. Only after the expiration of a defined time span is the transmission of message blocks that are to be inserted into the corresponding line queue reassumed proceeding from the respective switching computer, namely initially taking the message blocks inserted into the recovery or reset queue into consideration.

The afore-mentioned control techniques for the transmission of message blocks between switching computers and line termination equipment units thus represent a control or monitoring system. In particular, the size of the afore-mentioned line queues is thereby dependent on the overall running time of the control loop. The control loop is thereby composed of the transmission of a message block, of the recognition of an overload in one of the line queues, the return transmission of a corresponding control signal and of the reaction of the switching computer to such a control signal. Relatively long running times and memory sizes can potentially result therefrom, these being mainly undesirable.

SUMMARY OF THE INVENTION

It is an object of the present invention to show a way of how a method and a circuit arrangement for controlling the transmission of message blocks within a transmission system can be designed in order to reduce the overall running time of a control loop for the control of the transmission of message blocks.

According to the present invention, a flow control is provided connected to the packet memory input queue in the transmission processor unit. A filling degree of a packet memory input queue of the respective line termination equipment unit connected to the respective transmission processor unit is monitored and fed back to a flow control. Given the presence of a defined filling degree of the input queue of the line termination equipment unit, the output of message blocks to the input queue of the line termination equipment unit is suppressed. Additionally, the output of message blocks to be supplied to a particular interface is suppressed given an overload of that particular interface. This is accomplished by individually calculating a momentary load value for each of the interfaces and connected transmission lines for the respective line termination equipment unit. This calculation occurs in the respective transmission processor unit connected to the respective line termination equipment unit. The calculation of the momentary load value is based on the criterion of the number of message blocks respectively forwarded to the respective transmission line per unit of time and on the outflow rate for the respective transmission line. Given an upward crossing of a defined limit value by the momentary load value calculated for the respective interface and respective transmission line, the output of message blocks to that respective interface and respective transmission line is suppressed.

The invention thereby yields the advantage that the load of the individual interfaces as a result of supplied message blocks is exclusively calculated in the respective transmission processor, and thus no communications between the respective transmission processor and the line termination equipment unit contained thereto that influence the running time of the control loop are required. A further advantage is comprised therein that no memory arrangements corresponding to the line queues provided in the prior art are required at the individual interfaces of a line termination equipment unit.

Another advantage of the invention is the low circuit-oriented expense for the control system to be exclusively realized in the respective transmission processors for the transmission of message blocks between this transmission processor and the line termination equipment unit connected thereto.

The present invention shall be set forth in greater detail below with reference to an exemplary embodiment.

DESCRIPTION OF THE PREFERRED EMBODIMENTS

Figure 1:
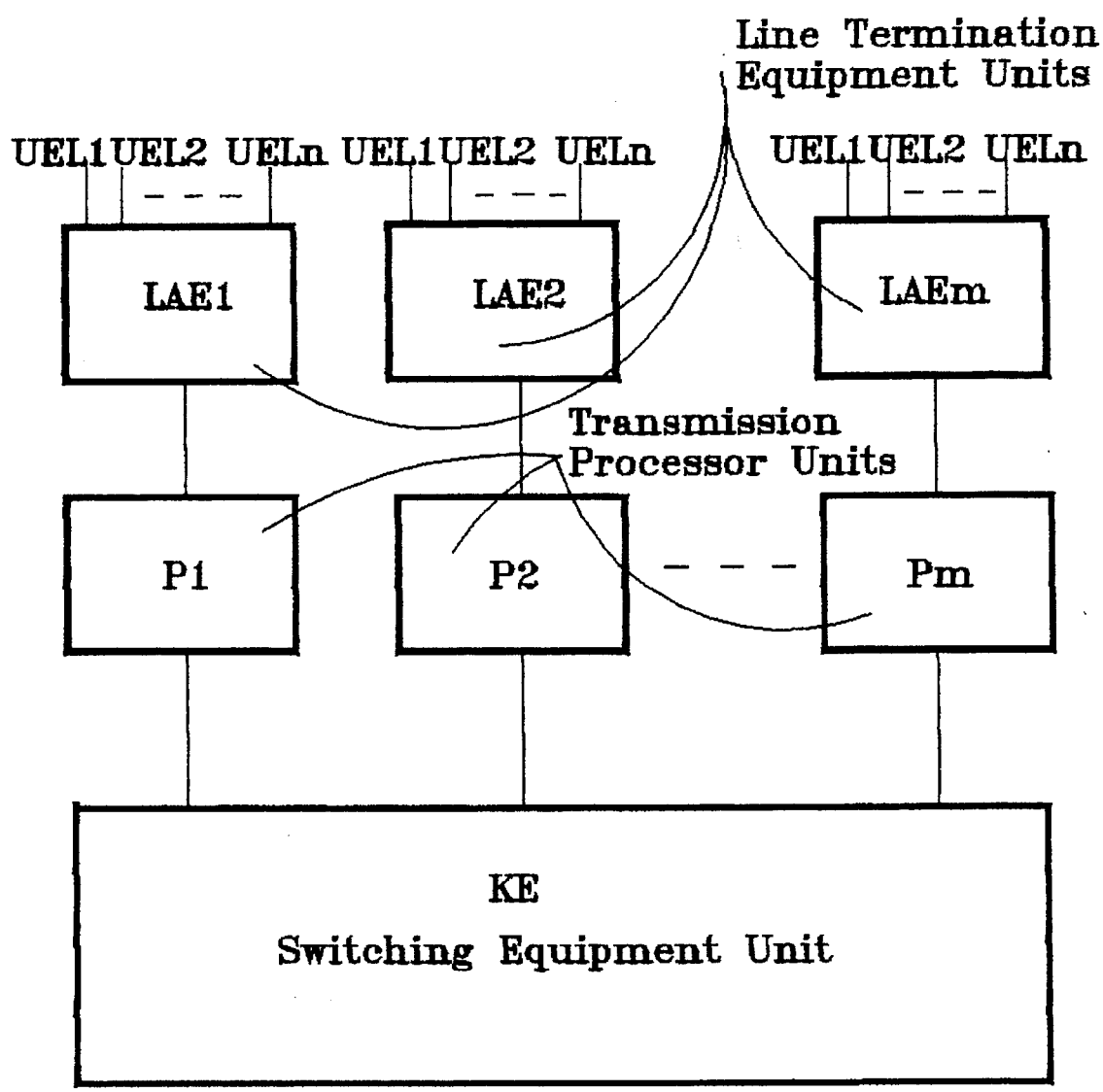
FIG. 1 schematically shows a transmission system wherein the invention is employed.

FIG. 1 schematically shows a transmission system which comprises a plurality m of identically designed transmission processor units P1...Pm. These transmission processor units are in communication, on the one hand, with one another via a switching equipment unit KE and, on the other hand, with a respective line termination equipment unit. These line termination equipment units, to which a respective plurality m of transmission lines UEL1...UELn are connected at interfaces, are referenced LAE1...LAEm corresponding to the allocation to the transmission processor units. Let the transmission system thereby be designed, for example, as a packet transmission system, whereby the switching equipment unit KE may be assumed, for example, to be a matter of a switching equipment or a plurality of switching equipment units connected to one another, of one or more cross connect equipment units, or of a ring line system.

Let the transmission of message signals within this transmission system thereby occur in the form of message blocks or message packets. Each of these message packets respectively contains, among other things, an address information with which the transmission line UEL1...UELn coming into consideration for the forwarding is referenced, in addition to containing the actual useful information to be transmitted. This address information is thereby contained, for example, in a packet header of the respective message packet. When the message packets are transmitted with a variable packet length, the packet header also has particulars with respect to the respective packet length, or the respective message packet is marked by a start and end identifier.

Figure 2:
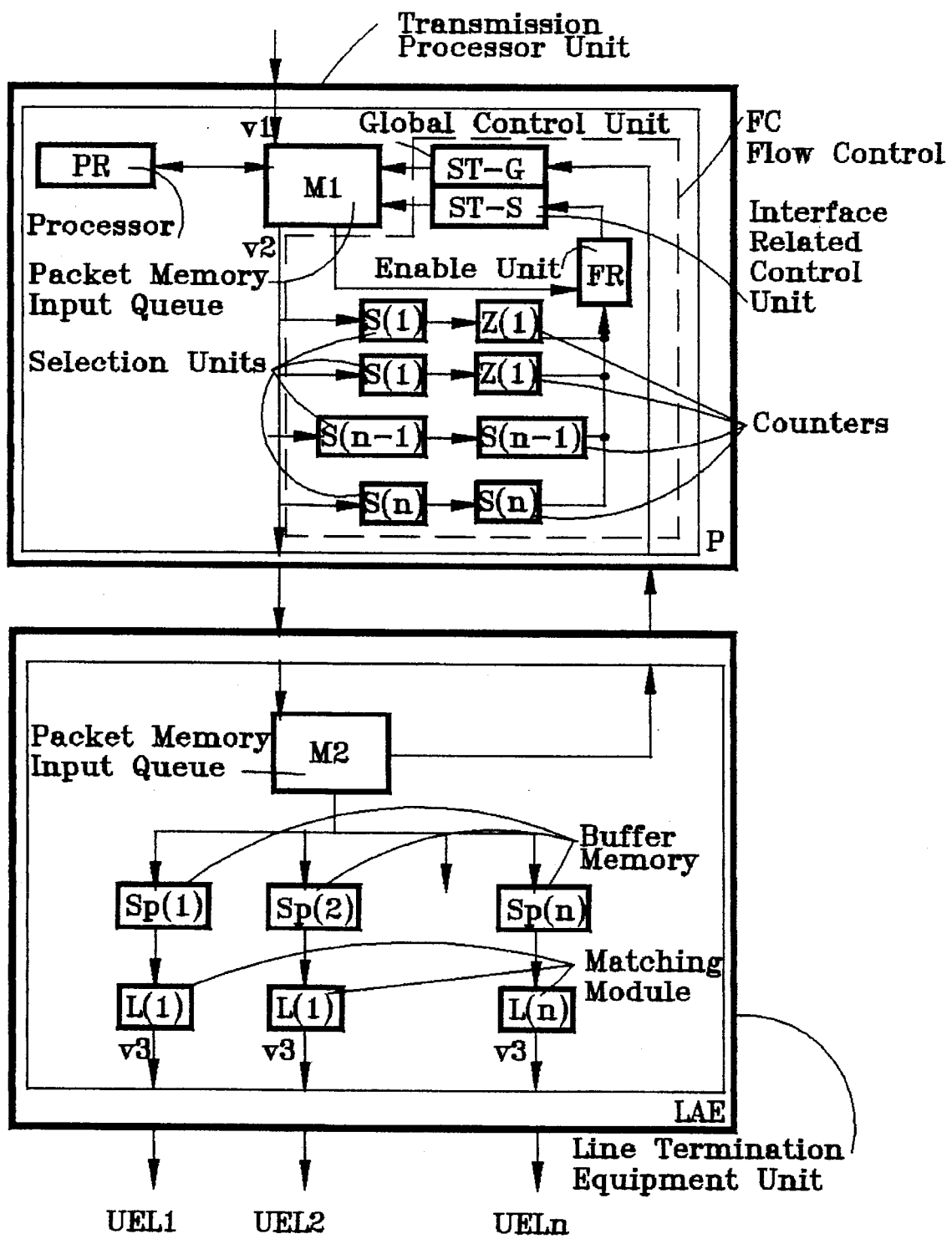
FIG. 2 shows portions of a possible structure of one of the transmission processor units schematically shown in FIG. 1, and also shows a line termination equipment unit connected thereto.

A possible structure of one of the transmission processor units indicated in FIG. 2 as well as a line termination equipment unit connected thereto are shown excerpted in FIG. 2. The transmission processor unit is thereby referenced P, and the line termination equipment unit is referenced LAE. Only those elements that are required for an explanation of the present invention are thereby indicated in this drawing figure.

The transmission processor unit P comprises a processor PR serving the purpose of the control of the acceptance and forwarding of message packets. This processor PR is connected, among other things, to a packet memory M1. The message packets supplied to the transmission processor unit with a transmission rate V1 via the switching equipment unit KE indicated in FIG. 1 are accepted into this packet memory. The packet memory thereby serves as a packet queue, i.e. as a speed-matching memory in order to forward the message packets to the corresponding line termination equipment unit LAE with a transmission rate V2 that is lower in comparison to the transmission rate V1.

At its input side, the line termination equipment unit LAE likewise comprises a packet memory M2 serving as a packet queue, for example in the form of a "first-in-first-out" memory from which the supplied message packets are distributed onto the transmission lines UEL1...UELn via interfaces shown in FIG. 1 based on the criterion of the address information respectively contained therein. It is thereby assumed that the message blocks are forwarded via the respective transmission line with an approximately constant outflow rate V3 that is lower than the transmission rate V2. A separate interface that is formed of a buffer memory SP, for example for protocol conversion, and of a matching module L is provided in the line termination equipment unit LAE for each of the transmission lines UEL1...UELn. The allocation to the respective line thereby proceeds from the reference characters placed in brackets.

Due to the multiple rate conversion that has just been recited, it can occur that the packet memory M2 in the line termination equipment unit LAE "overflows" given a longer overload due to an increased traffic volume if countermeasures are not undertaken. In order to prevent such an "overflow", a flow control FC is provided in the present exemplary embodiment, this being designed in two-stage fashion. According to a first, global flow control, the filling degree of the packet memory M2 is constantly monitored in the line termination equipment unit LAE, and a control signal indicating an overload is transmitted by the packet memory M2 to a global control unit ST-G shown in FIG. 2 when a defined threshold is reached. Under the control of this control means, the output of message packets by the packet memory M1 is then suppressed. It is assured in this way that all message packets that are processed in the transmission processor unit P and are sent to the line termination equipment unit LAE are also in fact forwarded to the transmission lines coming into consideration. This is particularly critical when the message packets output proceeding from the packet memory M1 are acquired by the processor in terms of call charges.

When an overload occurs only on one of the transmission lines UEL1...UELn, then the global flow control not only suppresses the forwarding of message packets to this transmission line, namely while discarding these message packets, but the transmission of message packets for the other transmission lines is also negatively influenced. In order to avoid this, a second flow control that is associated with the interface, and thus to the transmission line is provided. A momentary load value is calculated for this interface and respective transmission line in the transmission processor unit P. It is individually calculated for the individual interfaces, and thus transmission lines based on the criterion of the plurality of message packets respectively forwarded thereto per time unit and on the outflow rate for the respective transmission line. When a defined limit value is upwardly exceeded by the momentary load value calculated for such an interface, the output of message packets to only the respective interface is suppressed. For calculating the interface-associated load values, selection units individually allocated to the interfaces, and thus to the transmission lines are connected to the output of the packet memory M1. These selection units, are referenced S(1)...S(n) corresponding to their allocation to the transmission lines UEL1...UELn. The respective selection unit thereby has a counter following it, the counting range thereof being limited in view of the minimum and of the maximum counter reading. This, for example, can therefore be a matter of a forward/backward counter whose minimum counter reading is the counter reading "0". The individual counters are referenced Z(1)...Z(n) in FIG. 2 corresponding to their allocation to the selection equipment units S(1)...S(n).

The respective selection equipment unit is designed such that the message packets to be supplied to the allocated interface (transmission line) are acquired by it on the basis of the address information contained therein, and the momentary counter reading of the corresponding counter arrangement is incremented by a numerical value that corresponds to the packet length of the respective message packet. In case message packets having a variable packet length are transmitted within the transmission system, for example, the particulars with respect to the packet length that are contained in the packet headers of these message packets can be utilized for this purpose. Alternatively thereto, the respective selection equipment unit can calculate the packet length by counting, for example, the bytes contained in the respective message packet in case the packet headers of the message packets contain no particulars with respect to the packet length and the respective message packet is marked by a start and end identifier. Beyond this, the momentary counter reading of the respective counter can be directly incremented by a numerical value corresponding to the fixed packet length at every appearance of a message packet in case only message packets having a fixed packet length are transmitted within the transmission system.

In all of the afore-mentioned cases, the plurality of bytes belonging to the respective message packet can be used as a numerical value by which the momentary counter reading of a counter is to be incremented given the appearance of a message packet. However, a numerical value that deviates therefrom and is proportionally defined relative to the packet length of the respective message packet can also be utilized.

Beyond this, the respective counter $Z(1)\ldots Z(n)$ is deincremented at periodic time intervals by a respective numerical value corresponding to the outflow rate of the message packets on the respective transmission line. Here, too, either the plurality of bytes outflowing per time interval or a quantity proportional thereto is utilized.

When the momentary counter reading of one of the counters $Z(1)\ldots Z(n)$ upwardly exceeds a defined threshold, then a control signal indicating an overload of the respective interface, and thus of the transmission line is offered at a control output of the respective counter.

In the present exemplary embodiment, the control outputs of the counters $Z(1)\ldots Z(n)$ are connected in common to an enable unit FR to which an enable signal indicating the filling degree of the packet memory M1 is additionally supplied proceeding from the packet memory M1. A control signal supplied to the enable unit FR and indicating an overload of an interface is thereby only forwarded to an interface-related control unit ST-S when the enable signal indicates a filling degree of the packet memory M1 that lies above a defined threshold. Under the control of this control unit ST-S, the forwarding of message packets to the respective transmission line UEL1...UELn is then suppressed, i.e. the message packets intended for this transmission line are discarded. What this designational enabling of control signals indicating an overload achieves is that message packets are only discarded when the filling degree of the memory M1 upwardly exceeds the defined threshold.

Let it also be pointed out with respect to the exemplary embodiment set forth with reference to FIG. 2 that the equipment provided for the interface-related flow control can also be modified such that the selection equipment unit $S(1)\ldots S(n)$ can be replaced by a single selection equipment unit utilized in multiplex operation which, based on the criterion of the address information contained in the message packets, selects the counter coming into consideration for the respective message packet and thereby increments the momentary counter reading thereof in the above-recited way.

For identifying a counter $Z(1)\ldots Z(n)$ by the control unit ST-S, an address information indicating the respective counter and thus the allocated interface (transmission line) can, beyond this, be output to the control unit ST-S via the enable unit FR together with a control signal indicating an overload. Alternatively thereto, these control signals can also be transmitted to the control units ST-S via lines individually allocated to the counters.

Moreover, the counters can be realized either in terms of software or in terms of hardware, for example, in the form of counter modules or in the form of a programmable logic, dependent on the transmission rates.

Although various minor changes and modifications might be proposed by those skilled in the art, it will be understood that I wish to include within the claims of the patent warranted hereon all such changes and modifications as reasonably come within my contribution to the art.

I claim as my invention;

1. A method for control of transmission of message blocks in a transmission system formed of a switching equipment unit which is connected to a plurality of transmission processor units, each transmission processor unit being connected to a respective line termination equipment unit, each line termination equipment unit being connected to a plurality of transmission lines via respective interfaces, and wherein said switching equipment unit transmits message blocks to each of the transmission processor units, comprising the steps of:

providing each transmission processor unit with an input queue for reducing a transmission rate of the received message blocks;

providing each line termination equipment unit with an input queue for reducing a transmission rate of message blocks to be sent to the respective interfaces and connected transmission lines at those interfaces on the respective line termination equipment unit;

providing a control signal from the line termination equipment unit input queue indicative of a filling degree of the input queue;

providing a flow control in the respective transmission processor unit which receives said control signal indicative of filling degree; and employing said flow control to regulate message block flow through said input queue of said transmission processor unit such that given presence of a defined filling degree of the input queue of the line termination equipment unit, message block flow through the input queue of the transmission processor unit is suppressed; and a momentary load value is calculated for each of the individual interfaces and corresponding transmission lines for the respective line termination equipment unit connected to the respective transmission processor unit, said momentary load value being based on a number of message blocks respectively forwarded to the respective interface per unit time and on an outflow rate for the respective interface and respective transmission line, and given a crossing of a defined limit value by the momentary load value for the respective interface, output of message blocks in the input queue of the respective transmission processor unit to the respective interface and connected transmission line is suppressed.

2. A method according to claim 1 including the steps of providing an enable signal indicating a filling degree of the input queue of the respective transmission processor unit;

supplying said enable signal to an enable unit along with a control signal also supplied to the enable unit indicating an overload of an interface;

forwarding said control signal by said enable unit indicating an overload of an interface to an interface related control unit when the enable signal indicates a filling degree of the input queue of the respective transmission processor unit to a defined threshold; and under control of the interface related control unit, forwarding of message blocks through the input queue of the respective transmission processor unit is suppressed for the respective transmission line, and message blocks intended for that respective transmission line are discarded.

3. A method according to claim 1 wherein the switching equipment unit is a packet switching system wherein message blocks are transmitted as packets having variable length; and a length of the message blocks is also employed in said calculation of said momentary load value along with said number of message blocks respectively forwarded a period at a time.

4. A method according to claim 1 wherein the switching equipment unit is a packet switching system wherein message blocks are transmitted as packets having a fixed length.

5. A method according to claim 1 including the steps of:
   providing the message blocks leaving the input queue of the transmission processor unit with address information for identifying a particular interface and associated transmission line to which the message block is to be forwarded; and
   the line termination equipment unit distributing the message blocks according to said address information to the particular interface and associated transmission line.

6. A system for control of transmission of message blocks, comprising:
   a transmission system formed of a switching equipment unit which is connected to a plurality of transmission processor units, each transmission processor unit being connected to a respective line termination equipment unit, each line termination equipment unit being connected to a plurality of transmission lines via respective interfaces, and said switching equipment unit transmitting message blocks to each of the transmission processor units;
   each transmission processor unit having an input queue for reducing a transmission rate of the received message blocks;
   each line termination equipment unit having an input queue for reducing a transmission rate of message blocks to be sent to the respective interfaces and connected transmission lines at those interfaces on the respective line termination equipment unit;
   said line termination equipment unit input queue providing a control signal indicative of a filling degree of the input queue; and
   a flow control in the respective transmission processor unit for receiving said control signal indicative of filling degree, said flow control unit regulating message block flow through said input queue of said transmission processor unit such that
   given presence of a defined filling degree of the input queue of the line termination equipment unit, message block flow through the input queue of the transmission processor unit is suppressed, and
   a momentary load value is calculated for each of the individual interfaces and corresponding transmission lines for the respective line termination equipment unit connected to the respective transmission processor unit, said momentary load value being based on a number of message blocks respectively forwarded to the respective interfaces per unit time and on an outflow rate for the respective interface and respective transmission line, and given a crossing of a defined limit value by the momentary load value for the respective interface, output of message blocks in the input queue of the respective transmission processor unit to the respective interface and connected transmission line is suppressed.

7. A system according to claim 6 wherein said flow control unit comprises a plurality of selection units, each selection unit corresponding to a respective interface and connected transmission line for the respective line termination equipment unit connected to the respective transmission processor unit, each selection unit having its input connected to an output of said input queue of said transmission processor unit for acquiring based on address information contained in the message blocks those message blocks associated with the respective interface and the connected transmission line;

a counter connected following each selection unit for being incremented by a numerical value corresponding to a length of the respective message block, said counter being deincremented at time period intervals by a numerical value corresponding to an outflow rate of the message blocks, and said counter, given a crossing by the momentary counter reading of a defined threshold, generating a control signal indicating an overload of the respective interface to which the counter and respective selection unit corresponds.

8. A system according to claim 7 wherein outputs of the counters are connected to an enable unit which also receives from said input queue of said transmission processor unit a signal indicating filling degree of that input queue, and said enable unit outputting said control signal which is input thereto indicating an overload of a respective interface when the enable signal indicates a filling degree of the input queue of the transmission processor unit having crossed a defined threshold, said control signal output by said enable unit being connected to an interface related control unit to suppress forwarding of message blocks for the respective interface and connected transmission line.

9. A system according to claim 7 wherein the message blocks are provided in the form of packets having a variable packet length and only a packet start and end identifier are contained in the respective packet in addition to address information, wherein said selection units identify the packet length based on the packet start and end identifier, and wherein said counter connected to each respective selection unit is incremented based on the identified packet length.

10. A system according to claim 6 wherein said flow control comprises a global control unit for receiving said control signal from said input queue of said line termination equipment unit and for determining whether a threshold has been crossed for a particular filling degree of the input queue of the line termination equipment unit, and if the threshold is crossed, than controlling said input queue of said transmission processor unit to suppress forwarding of message blocks.

11. A system according to claim 6 wherein said line termination equipment units each have a plurality of buffer memories each connected to a respective matching module connected to each respective interface for each respective transmission line of the respective line termination equipment unit.

* * * * *